UNITED STATES PATENT OFFICE.

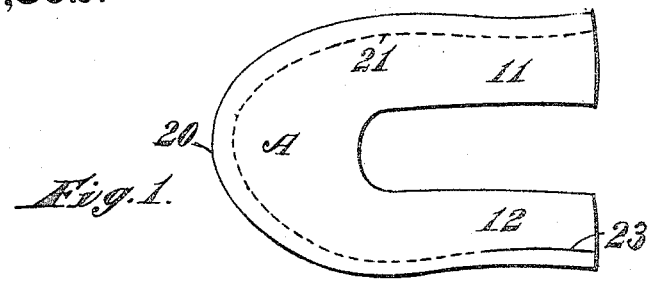
Fig. 1.
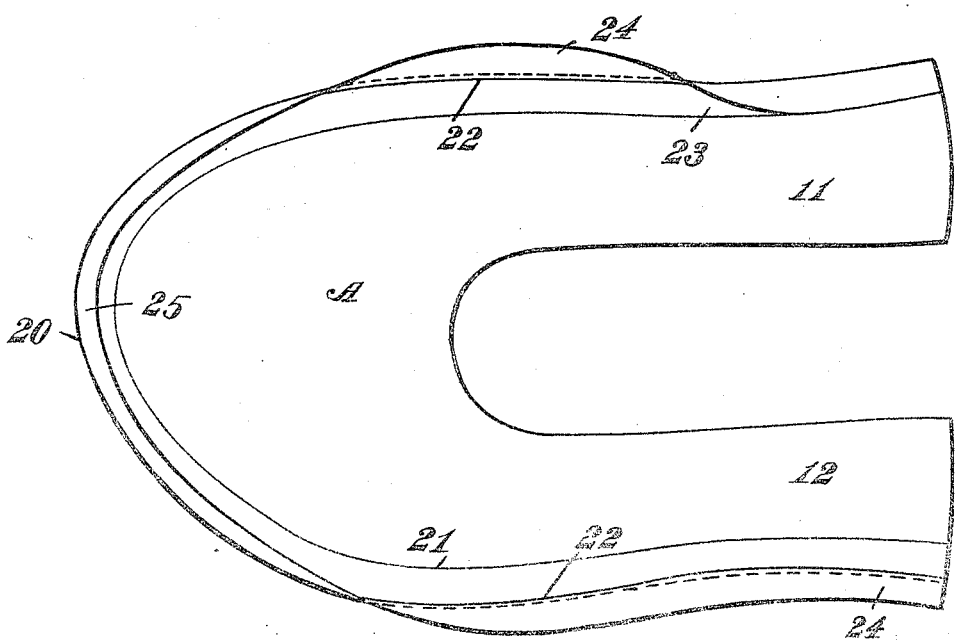
Fig. 2.
Fig. 3.
Fig. 4.
Fig. 5.

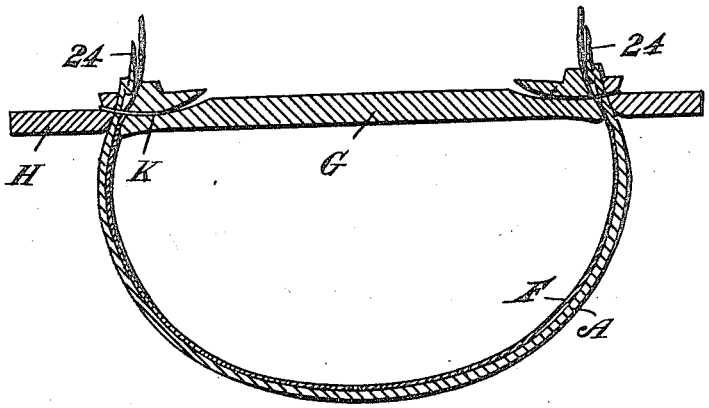
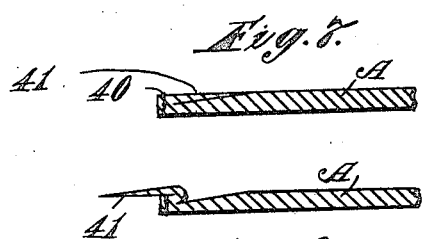
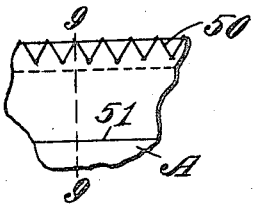
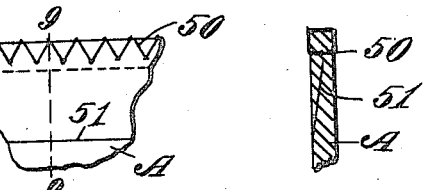
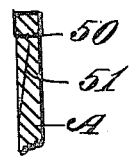
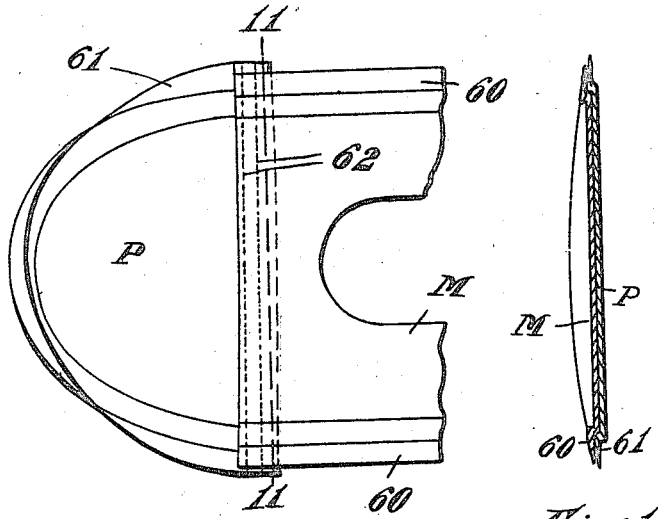
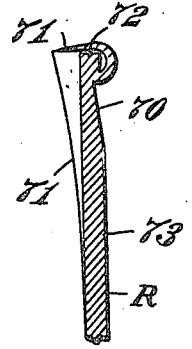

BENJAMIN BEHRMANN, OF MANCHESTER, NEW HAMPSHIRE.

SHOE-UPPER AND PROCESS OF MAKING THE SAME.

1,209,802.

Specification of Letters Patent. Patented Dec. 26, 1916.

Application filed June 26, 1916. Serial No. 105,959.

*To all whom it may concern:*

Be it known that I, BENJAMIN BEHRMANN, a citizen of the Empire of Russia, residing at Manchester, in the county of Hillsboro and State of New Hampshire, have invented certain new and useful Improvements in Shoe-Uppers and Processes of Making Same, of which the following is a specification.

This invention relates to shoes and has reference particularly to the uppers of welted shoes. Its object is to permit the quantity of leather necessary for such uppers to be reduced to the minimum, with a corresponding reduction in the cost of manufacture, without reducing the quality of the shoe of which the upper is to form a part.

In the ordinary process of making shoes, the upper is pulled over the last and sewed to the inner sole and welt, after which certain parts, including the edge of the upper, are trimmed off in the well-known manner. As this trimming is a waste product, strips of various kinds have been stitched along the edge of the upper, so that they can be grasped by the pincers of the pulling over machines and so that, when the aforesaid trimming is done, most of the strip, but little, if any, of the leather is cut away and becomes waste. The use of such strips involves the extra operation of sewing them on and the cost of the thread used in such sewing. With my invention, I save the cost of the strip, or of the strip and thread, and preferably I omit any sewing operation therewith. With my invention, I substantially increase the width of the upper at one operation, thereby saving expense.

In the drawings, Figure 1 is a plan view of an upper in a flat condition before it is pulled in place on the last with what is to become the inside edge of a channel indicated by dotted lines, one end of the channel being shown as cut. Fig. 2 is a similar plan view on a larger scale, showing at the bottom the channel cut and the lip turned outward and at the upper right hand corner, the channel cut but the lip not turned outward. Figs. 1 and 2 are under side up. Fig. 3 is an elevation of Fig. 2. Fig. 4 is an enlarged elevation of the end of the lower branch of the upper shown in Fig. 1, from the right. Fig. 5 is an enlarged view of the end of the lower branch of the upper shown in Fig. 2, from the right. Fig. 6 is a sectional view of a partially completed welted shoe with an upper of my construction pulled into position and sewed. Figs. 7 and 8 are detail sectional views, showing modifications of my construction. Fig. 9 is a plan view of part of an upper wrong-side up, showing a modification, and Fig. 10 is a section on line 9—9, of Fig. 9. Fig. 11 is a plan view of an upper with a separate toe cap stitched thereto, while both are flat, and shows them upside down. Fig. 12 is a sectional view on line 11—11 of Fig. 11. Fig. 13 is a side sectional elevation of a toe cap channeled on the upper side with the lip turned over.

A represents an upper as it is cut from the leather, having a toe portion 20 and branches 11 and 12, which are to form the sides or part of the sides of a shoe. I take this upper, which is shown in the drawings upside down, and on the under side, along the dotted line 21, shown in Fig. 1, and extending outward and downward, I cut the channel 23 by any well-known instrumentality. This channel extends from inside at the line 21 outward to a line 22, which is approximate to and substantially parallel with the outer edge of the upper to form a lip 24.

Preferably, as the channel is being cut, the cutting means is followed by turning-over means, such as a plow, whereby the said lip is bent outward to form a pulling-over extension. This lip 24 or pulling-over extension can readily be flattened out so as to lie substantially in the same plane with the rest of the upper, except adjoining the toe portion 20 where it will extend out more or less at right angles as shown at 25 in Figs. 2 and 3.

The upper is cut of such a size that this lip 24 will extend out sufficiently to be grasped by the pulling-over mechanism but that, after it is stitched to the inner sole and welt, none, or a very small part, of the upper will be trimmed off.

As shown in Fig. 6, the upper A and lining F are put together and are pulled over and sewed to the inner sole G and welt H by the thread K in a well-known manner.

In some cases, it may be desirable, as shown in Figs. 7 and 8 to stitch through and through by stitches 40, approximate to and parallel with the outer edge of the upper and to channel it on the underside from the inside outward to a line approximate to and substantially parallel with the stitching, to form a lip 41. This stitching 40 reinforces the edge, if necessary, but requires the additional operation of stitching.

As shown in Figs. 9 and 10, the stitching 50 may extend through and through and over the edge, the channel 51, of course, stopping before it reaches the stitching 50.

Many shoes are made with an upper in which the vamp is sewed to a toe cap, and for this construction I prefer to cut in the vamp M, channels which permit the lips 60 to be turned outward, and in the cap P to cut channels which permit the lip 61 to be turned outward. The cap P is then sewed to vamp M, by means of stitching 62, in the usual manner.

My invention covers the process of treating shoe uppers after they have been cut out of the flat leather, and before they have been pulled over on to the last, which consists of cutting a channel on what is to be the under side, extending from the inside outward to a line approximate to and substantially parallel with the outer edge to form a lip and, preferably while the cutting is being done, bending outwardly the lip formed by the cutting to form a pulling-over extension. My invention covers also the shoe upper which is the product of such a process.

The process may or may not include the through and through stitching, parallel with the outer edge of the upper.

I prefer to cut my channel in what is to be the under side of the upper, but it is manifest that I might cut the channel in the upper side or what is to be the outer side of the finished shoe, as shown in Fig. 13, in which R is a toe cap channeled in its upper side 73 at 70 to form a lip 71 which is not only turned outwardly but over edge 72 of the tip and then down.

I claim:

1. A shoe upper comprising a body portion of leather having a channel on the under side which extends from within the outer edge outward to a line approximate to and substantially parallel with the outer edge to form a lip connected to the upper by sufficient material to withstand the pulling over operation.

2. A shoe upper comprising a body portion of leather having a channel on the under side which extends from within the outer edge outward to a line approximate to and substantially parallel with the outer edge to form a lip connected to the upper by sufficient material to withstand the pulling over operation, said lip being bent outwardly to form a pulling-over extension.

3. A shoe upper comprising a body portion of leather stitched through and through approximate to and parallel with its outer edge, and having a channel on the under side which extends from within the outer edge outward to a line approximate to and substantially parallel with the stitching to form a lip.

4. A shoe upper comprising a body portion of leather stitched through and through approximate to and parallel with its outer edge and having a channel on the under side which extends from within the outer edge outward to a line approximate to and substantially parallel with the stitching to form a lip, said lip being bent outwardly to form a pulling-over extension.

5. A shoe upper comprising a body portion of leather stitched over the edge and through and through approximate to and parallel with its outer edge and having a channel on the under side which extends from within the outer edge outward to a line approximate to and substantially parallel with the stitching to form a lip.

6. The process of treating a shoe upper which consists of progressively cutting a channel on what is to be the under side extending from within the outer edge outward to a line approximate to and substantially parallel with the outer edge to form a lip connected to the upper by sufficient material to withstand the pulling over operation, and while the cutting is being done of bending such lip outwardly to form a pulling-over extension.

7. A shoe upper comprising a body portion of leather having a channel which extends from within the outer edge outward to a line approximate to and substantially parallel with the outer edge to form a lip connected to the upper by sufficient material to withstand the pulling over operation, said lip being bent outwardly to form a pulling-over extension.

In testimony whereof I hereto affix my signature.

BENJAMIN BEHRMANN.